Dec. 26, 1961    J. D. BOGOSIAN ET AL    3,014,740
MOUNTING DEVICE FOR ACCESSORIES
Filed Dec. 28, 1953

INVENTORS:
JOHN D. BOGOSIAN
ARTHUR PETERS
BY
Edward M. Tuttle 3,014,740
MOUNTING DEVICE FOR ACCESSORIES
John D. Bogosian, Lynn, and Arthur Peters, Lowell, Mass., assignors to General Electric Company, a corporation of New York
Filed Dec. 28, 1953, Ser. No. 400,563
1 Claim. (Cl. 285—82)

This invention relates to aircraft accessories and more specifically to a mounting device for aircraft accessories.

Certain aircraft engine accessories such as starters, hydraulic pumps or generators are often driven directly or through a gear train from the engine shaft. In this case the accessory is usually bolted to a standard mounting pad which is secured to the engine casing. In other applications accessories are often located remotely from the main power plant and are driven by smaller power units such as pneumatic turbines which are run by air bled from the compressor of the main jet engine. In this case the accessory is usually attached to the smaller power unit by bolting it to a mounting pad similar to the type commonly used on the engine casing. In aircraft applications the available space for the accessories is likely to be quite limited and relatively inaccessible for purposes of maintenance and installation. Accordingly it is desirable to provide a mounting device which requires a minimum of access space and is simple to operate. In addition, the relatively large inertia forces which accompany the maneuvers which may be encountered in flight make it important that the mounting means be sturdy enough to withstand high stresses.

An object of the invention is to provide an improved mounting device.

A further object of this invention is to provide a mounting device for an aircraft accessory which requires a minimum of access space.

Another object of this invention is to provide a mounting device for an aircraft accessory which is quickly and easily operated and yet is sturdy enough to withstand the severe stresses accompanying a high degree of maneuverability of the aircraft.

Broadly stated, the embodiment of my invention herein illustrated and described comprises a mounting flange which is bolted to a standard mounting pad on the accessory supporting member, a pair of annular shoulders which can be welded to the accessory frame and a clamping means which is tightened around the circumference of one of the shoulders on the accessory and a mating shoulder on the mounting flange.

Further objects and advantages will be apparent from the following description taken in connection with the accompanying drawing in which.

Figure 1:
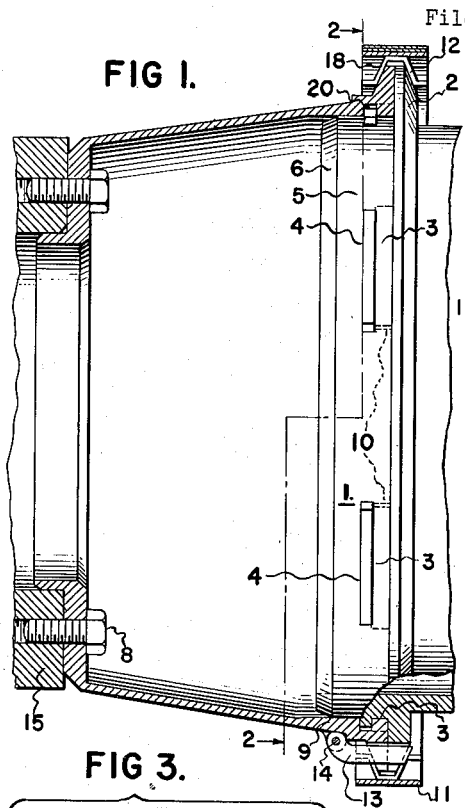
FIGURE 1 is a side elevation view, partly in section, illustrating, in an engaged position, an accessory machine and a mounting flange embodying present invention.
Figure 3:
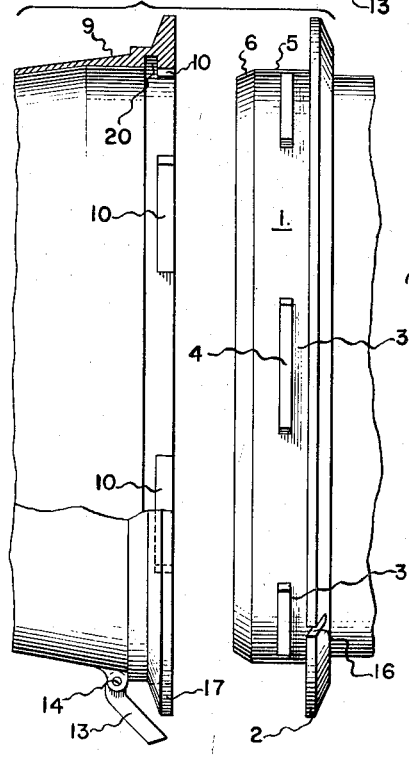
FIGURE 3 is a side elevation view, partly in section, illustrating the machine and mounting flange of FIGURE 1 in a disengaged position.
Figure 4:
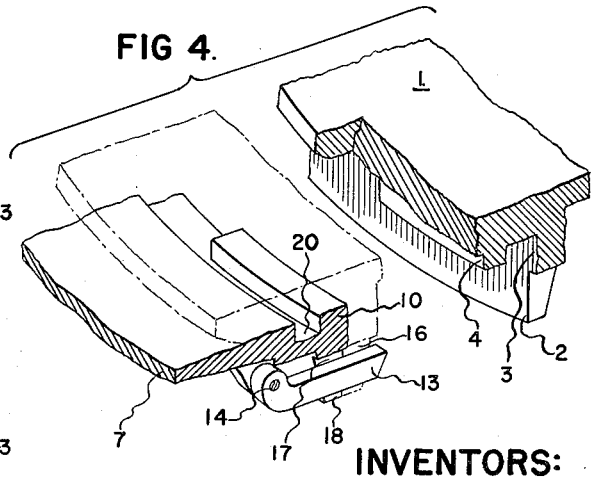
FIGURE 4 is an enlarged pictorial part of the arrangement shown in FIGURES 1 and 2 wherein the accessory is shown in engaged position (dotted) and disengaged position.

Referring to FIGURES 1 and 3, the accessory unit is designated generally at 1. The accessory frame is provided with an annular shoulder 2 which is adapted to receive a clamping ring 12 and an interrupted annular shoulder which forms a plurality of circumferentially extending congruent lugs 4 projecting outward as illustrated. These lugs 4 are equally spaced and, together with the annular shoulder 2, define a plurality of arcuate grooves therebetween. On the other side of the interrupted shoulder, the accessory frame end portion comprises a cylindrical section 5 and a frusto-conical section 6. The function of these sections in the mounting operation will be explained later.

A mounting pad flange 7 having a cylindrical open end portion 9 is secured to the accessory supporting member 15 by means of bolts 8 or other suitable fastening means. The open end portion 9 of the mounting flange 7 has an inner diameter slightly larger than the diameter of the machine end portions 3 and 5 and is also provided with an interrupted annular shoulder at its mouth which forms equally spaced and congruent lugs 10 extending radially inwardly as indicated. Also, at the mouth of the open end portion 9 of the mounting flange there is an annular shoulder 18 which extends outwardly from outer surface of the flange 7. The lugs 10 have a cross section conforming to the groove 3 between the lugs 4 and the annular shoulder 2 on the starter frame. The mounting pad flange is also provided with a circumferential recess or groove 20 immediately behind the lugs 10 which is adapted to receive the outwardly extending lugs 4 on the accessory frame. In order to enable the end portion of the accessory 1 to be interfitted within the open end 9 of the mounting flange 7, the circumferential spacing between the lugs 4 on the accessory casing is greater than the circumferential width of the lugs 10 associated with the mounting pad flange 7; and conversely the displacement between the lugs 10 is greater than the circumferential width of the lugs 4.

The mounting process is commenced by rotating the starter casing until the lugs 4 on the starter frame are aligned with the spaces between the lugs 10 on the mounting flange 7. The end of the accessory casing is then interfitted within the open end 9 of the mounting pad flange 7, the frusto-conical end section 6 acting as a pilot to facilitate the assembly. The cylindrical end portion 5 of the accessory frame serves to maintain the proper concentricity of the mount 7 with respect to the starter frame. The accessory end is inserted within the engine mount until the annular shoulder 2 on the accessory frame 1 seats against the adjacent surface of the annular shoulder 18 on the mounting flange, as shown in FIGURE 1. The accessory is then rotated either clockwise or counterclockwise until two slots 16 and 17 in the annular shoulders 2 and 18 respectively are in alignment. When in this position the mounting flange lugs 10 are aligned to the accessory lugs 4. The lugs 4 and 10 are now interlocked so as to hold the accessory in place without external support.

Figure 2:
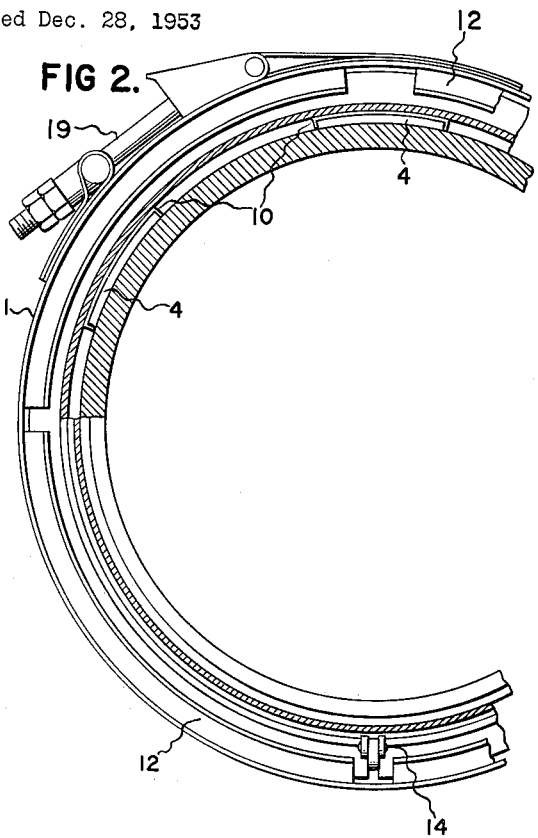
FIGURE 2 is an end view in cross section along the line 2—2 of FIGURE 1.

In order to prevent further rotation, restraining means are provided. The means used in the present embodiment comprises a key member 13 which is pivotally attached to the external surface of the mounting flange at 14. When the accessory is mounted in position and the slots 16 and 17 are in alignment, the key member 14 is swung inwardly as shown in FIGURE 1, to be within the keyway formed by the slots 16 and 17. The key member 13 is held within the keyway by a split clamping ring 12. The non-adjacent surfaces of the annular shoulders 2 and 18 are outwardly convergent in order to receive the clamping ring 12 as shown in FIGURE 1. As shown, the split clamping ring 12 has a channel-shaped cross section and is fastened to and surrounded by an annular steel band 11 which is provided with means for drawing together the ends thereof such as a threaded screw 19 as shown in FIGURE 2. As the threaded screw 19 is tightened drawing the ends of the band 11 together, the split clamping ring 12 is drawn down over the outwardly convergent surfaces of the shoulders 2 and 18. In forcing the clamping ring down over these surfaces it is flexed outwardly causing the radial constricting force to be resolved into an axial component pressing the shoulders 2 and 18 together.

Any number of similar clamping rings may be used without departing from the spirit and scope of this invention. One form of similar clamping ring is described in United States Patent 2,424,436—Crater.

After the accessory is mounted and the key 13 is inserted in the keyway formed by slots 16 and 17 the clamping band 12 is put into place and tightened down to draw the annular shoulders 2 and 18 tightly together.

In order to disconnect the accessory 1 from the flange 7 the bolt 19 is loosened thereby loosening the clamping ring 12 and the accessory is rotated to disengage the interlocking lugs 4 on the starter frame and lugs 10 on the mounting flange. The accessory is then free to be withdrawn from the mounting flange axially.

While a particular embodiment of the invention has been illustrated and described it will be obvious to those skilled in the art that various changes and modifications may be made without departing from the invention, and it is intended to cover in the appended claim all such changes and modifications that come within the true spirit and scope of the invention.

What we claim as new and desire to secure by Letters Patent of the United States is:

Quick attach-detach means for removably securing an accessory to a mounting pad on an aircraft engine comprising: a mounting flange secured to the engine mounting pad having a rigid end portion of interior cylindrical form adjacent its outer end, an accessory having a frusto-conical end portion and a cylindrical end portion adjacent thereto, the combined axial lengths of said frusto-conical end portion and said cylindrical end portion on said accessory being short compared to the diameter of said accessory, said frusto-conical end portion acting as a pilot surface in inserting the accessory end within said end portion of said mounting flange and said cylindrical portion on said accessory serving to maintain the proper concentricity between said mounting flange and said accessory, a first annular shoulder projecting radially from the outer peripheral surface of said accessory end portion, a first plurality of circumferentially extending equally spaced lugs projecting radially from the outer peripheral surface of said accessory end portion between said first annular shoulder and the frustro-conical end portion of said accessory, said first annular shoulder and said first plurality of lugs forming a plurality of circumferentially extending equally spaced grooves therebetween, means to engage said accessory to said mounting flange comprising a second annular shoulder projecting radially from the outer peripheral surface of said mounting flange, a second plurality of circumferentially extending and equally spaced lugs projecting radially inwardly from the interior cylindrical surface of the rigid end portion of said mounting flange and being constructed to fit contiguously within said grooves when said accessory end portion is partially rotated within said flange, rotational restraining means to prevent further rotation of said accessory when said second plurality of lugs are engaged within said grooves, said restraining means comprising apertures in each of said annular shoulders and a key extending into said apertures, a split clamping ring encircling said first and second annular shoulders, means on said clamping ring to engage said key and hold it in said apertures, and means for drawing together the ends of said clamping ring to draw and hold said first and second annular shoulders tightly together.

References Cited in the file of this patent

UNITED STATES PATENTS

| | | |
|---|---|---|
| 266,359 | Gotzel | Oct. 24, 1882 |
| 1,038,840 | Brookfield | Sept. 17, 1912 |
| 2,269,664 | Hallerberg | Jan. 13, 1942 |
| 2,353,572 | Kuster | July 11, 1944 |
| 2,457,908 | Meyerhoefer | Jan. 4, 1949 |
| 2,628,596 | Bachle | Feb. 17, 1953 |
| 2,645,438 | Kalikow | July 14, 1953 |
| 2,710,763 | Gilbert | June 14, 1955 |

FOREIGN PATENTS

| | | |
|---|---|---|
| 4,979 | Great Britain | Feb. 27, 1913 |
| 26,012 | Great Britain | Sept. 17, 1912 |